Aug. 25, 1936.        C. F. JOHNSON         2,052,473
BRAKE EQUALIZER
Filed Feb. 11, 1935        2 Sheets-Sheet 2
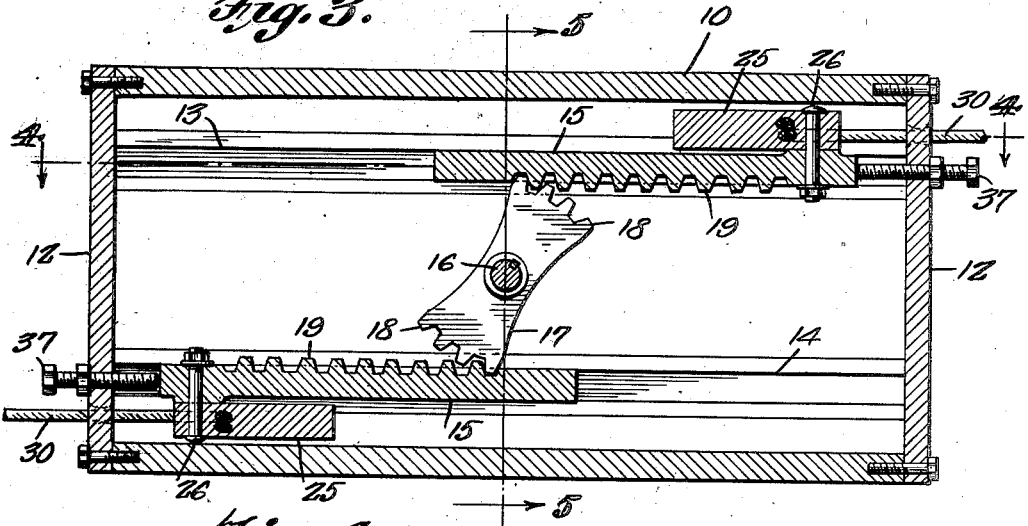
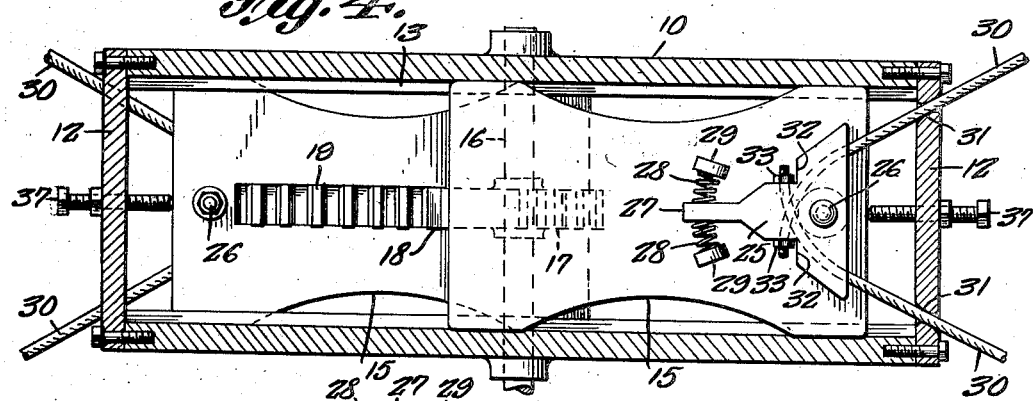
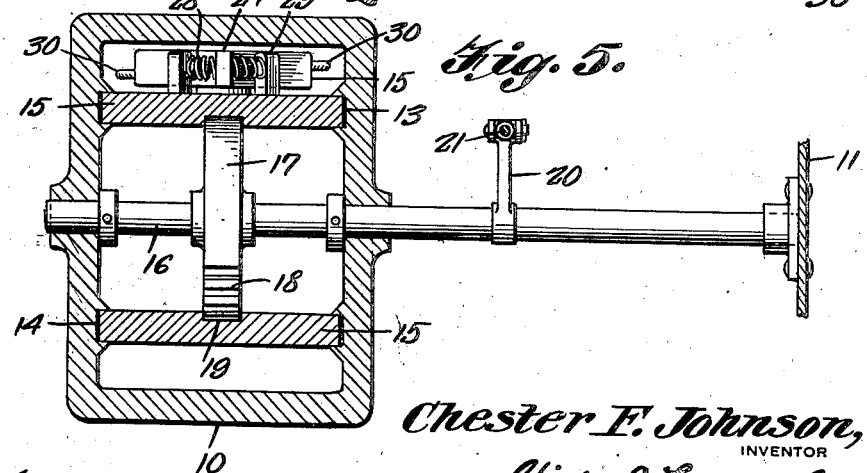
Chester F. Johnson,
INVENTOR Patented Aug. 25, 1936

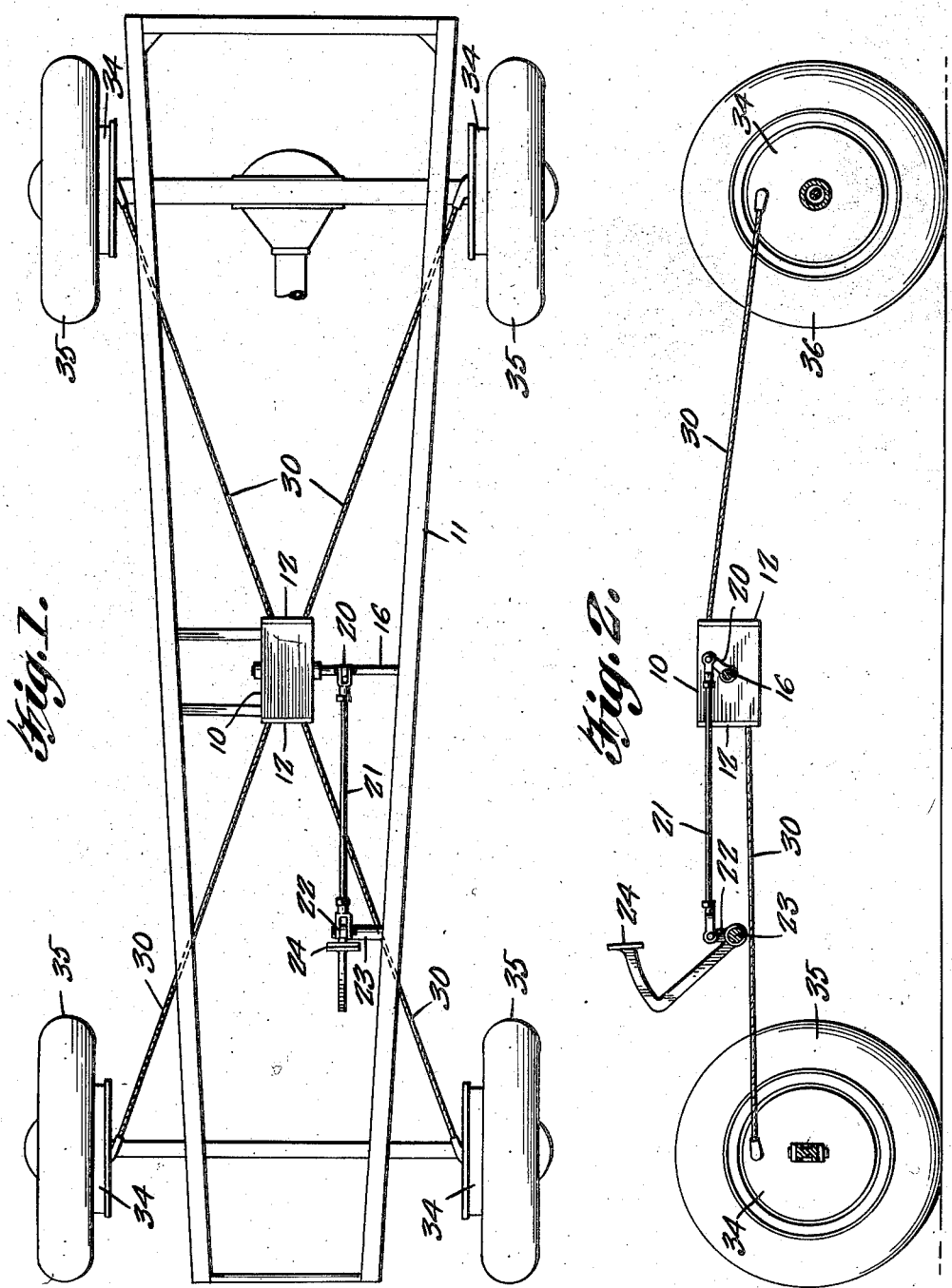

2,052,473

UNITED STATES PATENT OFFICE 2,052,473

BRAKE EQUALIZER

Chester F. Johnson, Los Angeles, Calif.

Application February 11, 1935, Serial No. 6,063

3 Claims. (Cl. 188—204)

The invention relates to brakes for automobiles and more especially to front and rear brake equalizers.

The primary object of the invention is the provision of an equalizer of this character, wherein a uniform application of brakes of a vehicle, can be had by manually operating a foot pedal or the like and thus assuring even wear and avoiding irregularity in the application of the brakes.

Another object of the invention is the provision of an equalizer of this character, wherein the application of four-wheel brakes is had in a single operation and the force will be applied equally to the front and to the rear brakes, the device being of novel construction and simple in its make-up.

A further object of the invention is the provision of an equalizer of this character, which is extremely simple in construction, thoroughly reliable and efficient in its operation, automatically acting, strong, durable, and inexpensive to manufacture and install.

With these and other objects in view, the invention consists in the features of construction, combination and arrangement of parts as will be hereinafter more fully described in detail, illustrated in the accompanying drawings which disclose the preferred embodiment of the invention and pointed out in the claims hereunto appended.

In the accompanying drawings:

Figure 1 is a plan view of an automobile chassis provided with braking mechanism and including the equalizer constructed in accordance with the invention, the braking mechanism being shown diagrammatically.

Figure 2 is a vertical longitudinal sectional view.

Figure 3 is an enlarged vertical sectional view through the equalizer.

Figure 4 is a sectional view on the line 4—4 of Figure 3 looking in the direction of the arrows.

Figure 5 is a sectional view on the line 5—5 of Figure 3 looking in the direction of the arrows.

Similar reference characters indicate corresponding parts throughout the several views in the drawings.

Referring to the drawings in detail, 10 designates a housing or casing which is adapted to be supported approximately midway of the length of an automobile chassis 11 and this housing includes removable end plates or heads 12 which are fastened in place in any desirable manner. Within the housing or casing 10 are the longitudinally directed upper and lower tracks 13 and 14, respectively, for superposed slides 15, while journaled transversely of the housing or casing is a rotatable shaft 16 carrying an actuator 17 having gear teeth 18 meshing with tooth racks 19 provided on the slides 15 so that these will be shifted in reverse directions to each other upon the tracks within the housing or casing 10.

The shaft 16 exteriorly of the housing or casing 10 carries an arm 20 with which is pivoted a throw rod 21, the same being pivoted to an arm 22 upon a pedal shaft 23 carrying a pedal 24 adapted to be foot operated and in this manner the actuator 17 will be moved for reversely shifting the slides 15.

Pivotally supported on each slide 15 at the longitudinal median thereof and at the outer end is an equalizer lever 25, the pivot therefor being indicated at 26 and this lever at the end 27 is disposed between a pair of opposed compression springs 28 seated against spaced abutments 29 on the slide 15. The springs 28 when compressed return the equalizer levers 25 to their original position after each application of the brakes. Disposed at opposite sides of the pivot 26 for the lever 25 are brake applying cables 30 these being trained through suitable openings 31 in each end plate or head 12 and are anchored in counterseats 32 by fasteners 33 in crossed over relation to each other in the said lever 25, these cables 30 being extended to and operate brakes 34 for the pairs of front and rear wheels 35 and 36, respectively, the brakes 34 being of the conventional drum type.

In the end plates or heads 12 in the path of movement of the slides 15 are adjustable stop screws 37 which limit the outward sliding movements of said slides.

On manipulating the foot pedal 24, it being understood, of course, that the brakes 34 are normally neutral or are not applied, the slides 15 will be moved by the actuator 17 pulling upon the cables 30 thus causing the application of the brakes.

It is, of course, understood that the brakes 34 return to neutral position when the foot pedal 24 is released and this is had through spring action through the medium of the springs of the brakes (not shown) and standard equipment therewith.

From the foregoing it is thought that the construction and manner of operation of the equalizer will be clearly understood, therefore, a more extended or detailed explanation has been omitted for the sake of brevity.

What is claimed is:

1. The combination with brakes, of pull cables connected with said brakes, reversely movable slides having pivotal levers carried thereby with the pull cables adjustably anchored thereto, means for reversely moving said slides, a housing for said slides and having tracks supporting said slides and compression springs carried by said slides arranged at the opposite sides of the lever and designed to be compressed by said lever in the swinging thereof.

2. The combination with brakes, of pull cables connected with said brakes, reversely movable slides having pivotal levers carried thereby with the pull cables anchored thereto, means for reversely moving said slides, a housing for said slides and having tracks slidably supporting said slides, compression springs carried by said slides and acting upon the levers by the swinging of the levers and adjustable means for limiting the movement of the slides in one direction in said housing.

3. The combination with brakes, of pull cables connected with said brakes, reversely movable slides having pivotal levers carried thereby with the pull cables adjustably anchored thereto, means for reversely moving said slides, a housing for said slides and having tracks supporting said slides, compression springs carried by said slides and acted against by the levers upon the swinging thereof, adjustable means for limiting the movement of the slides in one direction in said housing and removable end plates on the housing and having openings for said pull cables.

CHESTER F. JOHNSON.